United States Patent

[11] 3,543,727

| [72] | Inventor | Warren C. Reed<br>713 E. Prospect St., Kewanee, Illinois 61443 |
|---|---|---|
| [21] | Appl. No. | 692,775 |
| [22] | Filed | Dec. 22, 1967 |
| [45] | Patented | Dec. 1, 1970 |

[54] AUTOMATIC LIVESTOCK FEEDING MACHINE
2 Claims, 3 Drawing Figs.

[52] U.S. Cl. ........................................... 119/51.11, 119/56
[51] Int. Cl. ............................................. A01k 05/02
[50] Field of Search ........................................... 119/52- —56, 51.11

[56] References Cited
UNITED STATES PATENTS

| 1,387,997 | 8/1921 | Page | 119/54 |
| 1,433,904 | 10/1922 | Mudge | 119/56 |
| 1,540,290 | 6/1925 | Selinger et al. | 119/56 |
| 1,845,072 | 2/1932 | Beckman | 119/56 |
| 2,416,825 | 3/1947 | Dowling | 119/55 |
| 2,565,801 | 8/1951 | Byers | 119/56 |
| 2,793,791 | 5/1957 | Clark | 119/56X |
| 3,213,829 | 10/1965 | Zumbahlen | 119/56 |
| 3,368,529 | 2/1968 | Ferris | 119/51.11 |
| 2,659,346 | 11/1953 | Paparazzo et al. | 119/52 |

Primary Examiner—Aldrich F. Medbery
Attorney—Gifford I. Holmes

ABSTRACT: An automatic livestock-feeding machine having improved means for dispensing feed in predetermined quantities and at predetermined intervals of time. The improved dispensing means including a rotatable feed supply drum having a plurality of feed compartments of different capacities disposed to transfer feed from a supply tank to an animal feed tray.

Patented Dec. 1, 1970  3,543,727
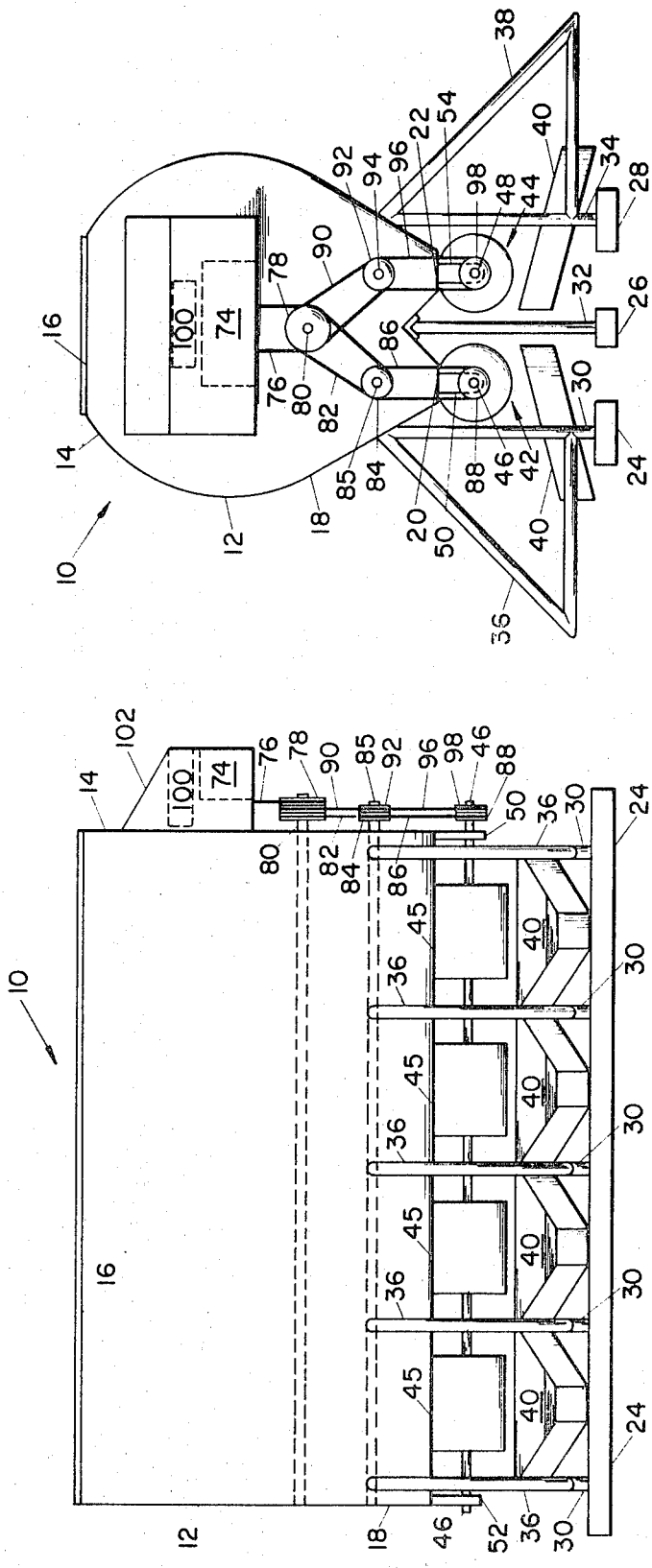
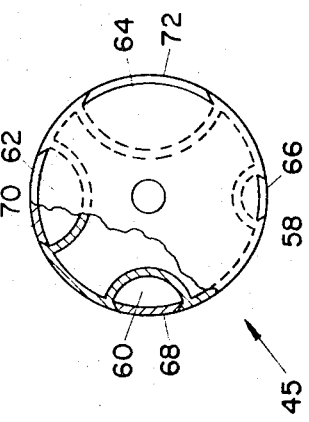
INVENTOR.
WARREN C. REED
BY Roger W. Nolan Jr.
ATTORNEY

AUTOMATIC LIVESTOCK FEEDING MACHINE

BACKGROUND OF THE INVENTION

1. Field of the Invention: An improvement in automatic equipment for feeding livestock.

2. Description of the Prior Art: Livestock-feeding equipment of the type herein described is categorized by the two different types of feeding operations presently being utilized, one, the full feeding operation and two, the limited or "-feeding" operation. In the full feeding operation the livestock is confined to a relatively small area and the livestock is exposed to all the feed which they can consume. The feeding apparatus for full feeding operations includes apparatus for scooping or augering the feed to the feed bunks or self-contained gravity flow apparatus. In the limited operation the livestock are in large lots or in fields and supplemental quantities of feed are given to the livestock at predetermined time intervals. Present limited feeding of livestock is generally done manually by placing feed in troughs or bunks and in some instances by equipment which dispenses a certain quantity of feed in the trough or bunk at periodic intervals.

The disadvantages of the apparatus presently available for full feeding and limited operations are that feed is wasted, that some animals consume more than required and others less than required, that fresh feed is not made available to the livestock as often as required and that proper feeding is not accomplished without an excessive amount of labor. The present invention provides a livestock-feeding machine whereby each animal is automatically fed the required predetermined amount of feed and at predetermined intervals of time.

SUMMARY OF THE INVENTION

The present invention provides a novel livestock-feeding machine wherein the combination of volume feed tank, feed supply drums and feed pan provides for individual feeding of livestock predetermined quantities of feed at predetermined intervals of time. More particularly the feed supply drum includes a plurality of feed compartments of differing capacities and in operation has one such compartment open to receive feed from the feed tank and dispense the feed into the feed pan. The feed supply drums are driven by an electric motor controlled by a timing mechanism.

The disadvantages of existing apparatus as heretofore stated are overcome in that each animal is fed fresh feed from an individual feed pan as dispensed from the volume tank through the feed supply drum and each animal is fed the required quantity of feed at the desired intervals of time. The machine of the present invention may be utilized in the controlled area of a full feed operation or in an open area of a limited feed operation.

The primary object of the present invention is to provide a livestock feeding machine wherein each animal of a herd is individually fed its predetermined requirements of a feed. A further object of the present invention is to provide a livestock-feeding machine suitable for use in a full feed operation or a limited feed operation.

A still further object of the present invention a is to provide a livestock feeding machine suitable for feeding a variety of types of livestock from the same machine. A still further object of the present invention is to provide a livestock-feeding machine which is economical to operate and which does not require attention for long intervals of time.

BRIEF DESCRIPTION OF THE DRAWING

FIG. 1 is a side elevational view of the livestock-feeding machine of the invention.

FIG. 2 is an end elevational view of the livestock-feeding machine.

FIG. 3 is an enlarged view partly broken away showing the feeding drum of the invention.

DESCRIPTION OF THE PREFERRED EMBODIMENT

Referring now to the drawing and in particular to FIGS. 1 and 2, there is shown a livestock-feeding machine which is designated generally by the numeral 10. The feeding machine 10 includes an elongated feed volume tank or bin 12 having an upper portion 14 provided with an inlet 16 for supplying feed into the tank 12 and a lower portion 18 tapering down into a double-V construction. Each V has a series of openings 20 and 22 for discharging feed from the tank 12. It can be readily seen that the tank 12 may have a vertical divider (not shown) disposed within the tank 12 thereby permitting different feeds to be supplied in each side of the tank 12. The double-V construction provides advantageous results but within the purview of the invention it can be seen that a single-V lower portion can be utilized.

The tank 12 is rigidly mounted on skids 24, 26 and 28 by means of a plurality of vertical support members 30, 32 and 35 fixed to said skid and support members. It can be readily seen and with the purview of the invention that advantageous results can be realized by utilizing wheels in addition to or in place of the skids 24, 25 and 28 whereby additional mobility is provided for the feeding machine 10. A plurality of dividing members 36 and 38 are alined respectively with the outer support members 30 and 34, thereby defining separate feeding stations. Disposed in each station, between each combination of support members and dividing members (combinations 30 and 36 and combination 34 and 38), are feed pans 40 which are supported and held in place by means of the support members 30 and 34. For illustration purposes only the feeding machine 10 is shown having four feeding stations on each side. It can be readily seen the machine is not limited as to the number of stations which can be provided. Means for adjusting (not shown) the feed pans 40 may be included whereby their elevation is altered for the type of animal being fed.

Livestock feed from feed volume tank 12 passes through the series openings 20 and 22 into a series of feed supply drums 42 and 44 which are disposed for rotation relative to the openings 20 and 22 respectively. Each of the series of drums 42 and 44 include a plurality of drum elements 45 mounted on common shafts 46 and 48 respectively. Each of the series of drums 42 and 44 include a plurality of drum elements 45 mounted on common shafts 46 and 48 respectively. Shaft 46 is mounted for rotation within end supports 50 and 52 which are fixed to the tank 12 and shaft 48 is mounted for rotation within end supports 54 and 56 (not shown) which are fixed to the tank 12. A single drum element of the supply drums 42 and 44 is located in each feeding station and disposed to supply feed to the feed pans 40.

Referring now to FIG. 3 wherein the details of the drum elements 45 are illustrated there is shown four compartments 58, 60, 62 and 64 each having different capacity. Each compartment is provided with a slidable lid 66, 68, 70 and 72 constructed to be inserted and removed from the drum 45. Generally in operation of the feeding machine 10 only one of the lids 66, 68, 70 and 72 is removed thus permitting the predetermined quantity of feed to be transferred from the tank 12 to element 45 to the feed pans 40. It can also be readily seen that advantageous results could be obtained by having one or more lids removed thereby passing different quantities of food into the pans 40 at different intervals of time. It can also be seen that the various elements 45 may have different lids 66, 68, 70 and 72 removed from the compartments 58, 60, 62 and 64 thereby providing varying amounts of feed in each station in feed pans 40. The drum element 45 shown in the drawing includes four compartments but it can be readily seen that any number of compartments can be advantageously used and such modifications are to be considered within the purview of the present invention.

In FIGS. 1 and 2 there is shown power means for driving feed supply drums 42 and 44, the power supply means comprises an electric motor 74 disposed to drive drums 42 and 44 through a combination of belts and pulleys. Motor 74 through belt 76 drives pulley 78 which is mounted on shaft 80. Pulley 78 through belt 82 drives pulley 84 mounted on shaft 85 which in turn imparts motion to drum shaft 46 through belt 86 and pulley 88 mounted on shaft 46. A similar action drives shaft 48; pulley 78 through belt 90 drives pulley 92 mounted on shaft 94 which in turn imparts motion to drive shaft 48 through belt 96 and pulley 98 mounted on shaft 48.

Advantageously, shafts 80, 85 and 94 extend through the feed volume tank 12 and have mixing means (not shown) mounted thereon, the mixing means can be of any common form and may be of the nature of impeller blades. The impellers may advantageously be pitched to create the desired mixing action required for the particular feed used. It is understood that for certain feeds used for livestock that mixing is not required.

The electric motor 74 is controlled by means of a control mechanism 100. Both motor 74 and mechanism 100 are housed in a weather proofed housing 102 fixed to the tank 12. Control mechanism 100 may advantageously include an electric timer having the capability to sequence the operation of the motor 74 and thus the supply of feed from tank 12 through the feed drums 45 to feed pans 40. The control mechanism 100 may also advantageously include a reversing means for further varying the sequence of operation.

OPERATION

In operation of the livestock-feeding machine 10 the volume tank 12 is filled with feed through inlet 16. Feed is thus available to exit through the series of openings 20 and 22. Drum elements 45 are disposed to have one or more of the compartments 58, 60, 62 and 64 open to receive feed through openings 20 and 22. The particular compartment or compartments which are open is dependent upon the quantity of feed required in the feed pan 40 at that feeding station.

At preselected times during a 24-hour day control mechanism 100 actuates electric motor 74 which in turn drives the drum 45 which rotates one revolution. During the middle of the revolution the feed from the compartments of drum 45 are deposited into feed pan 40. During the rotation of drums 45 a mixing action occurs within the tank 12 by means of the impellers mounted on the shafts 80, 85 and 94 which shafts are driven by the motor 74. Further, during the rotation of the drums 45, passage of feed through the openings 20 and 22 is prevented by means of exterior of the drums 45 which provides an effective seal in combination with the openings 20 and 22.

It will be understood that the livestock-feeding machine which is herein disclosed and described is presented for the purposes of explanation and illustration and is not intended to indicate limits of the invention, the scope of which is defined by the following claims.

I claim:

1. A livestock-feeding feeding machine for dispensing predetermined quantities of feed to livestock at predetermined intervals of time during successive periods of time comprising in combination, a support structure, a volume feed tank mounted atop said structure and having a plurality of bottom openings for passage of feed through the lower portion of the feed tank, a plurality of feed-distributing members supported by said structure and being disposed below said feed tank and arranged for providing feed for individual animals, a plurality of generally cylindrical drum means disposed between said bottom openings arranged for passage of feed from said feed tank to said feed-distributing members and being positioned for receiving feed from said tank and depositing same in said distributing members, said cylindrical drum means including a plurality of feed conveying compartments of graded volumetric capacities for conveying different quantities of feed between the openings for effecting passage of feed from said tank to said distributing members, a plurality of closure means for said feed conveying compartments for preventing passage of feed from said tank to said distributing members, each said closure means being arranged slideably in selective relationship to each said feed conveying compartment of said drum means to provide a means for the closure of one or several of said compartments by opening only a predetermined number of single or combined compartments at the will of the operator, and time controlled power means for rotating said drum means at least one revolution at predetermined intervals of time.

2. A livestock feeder according to claim 1 including pitched impeller means mounted upon a shaft driven by said power means, said impeller means being disposed for impelling the feed longitudinally in said feed tank axially with relationship to the shaft.